Nov. 16, 1965

L. J. ERNST 3,217,572

PRECISION TURNING AND BORING ATTACHMENT

Filed Nov. 12, 1963

INVENTOR.
LEO J. ERNST

BY *Neil J. Duncalf*

ATTORNEY

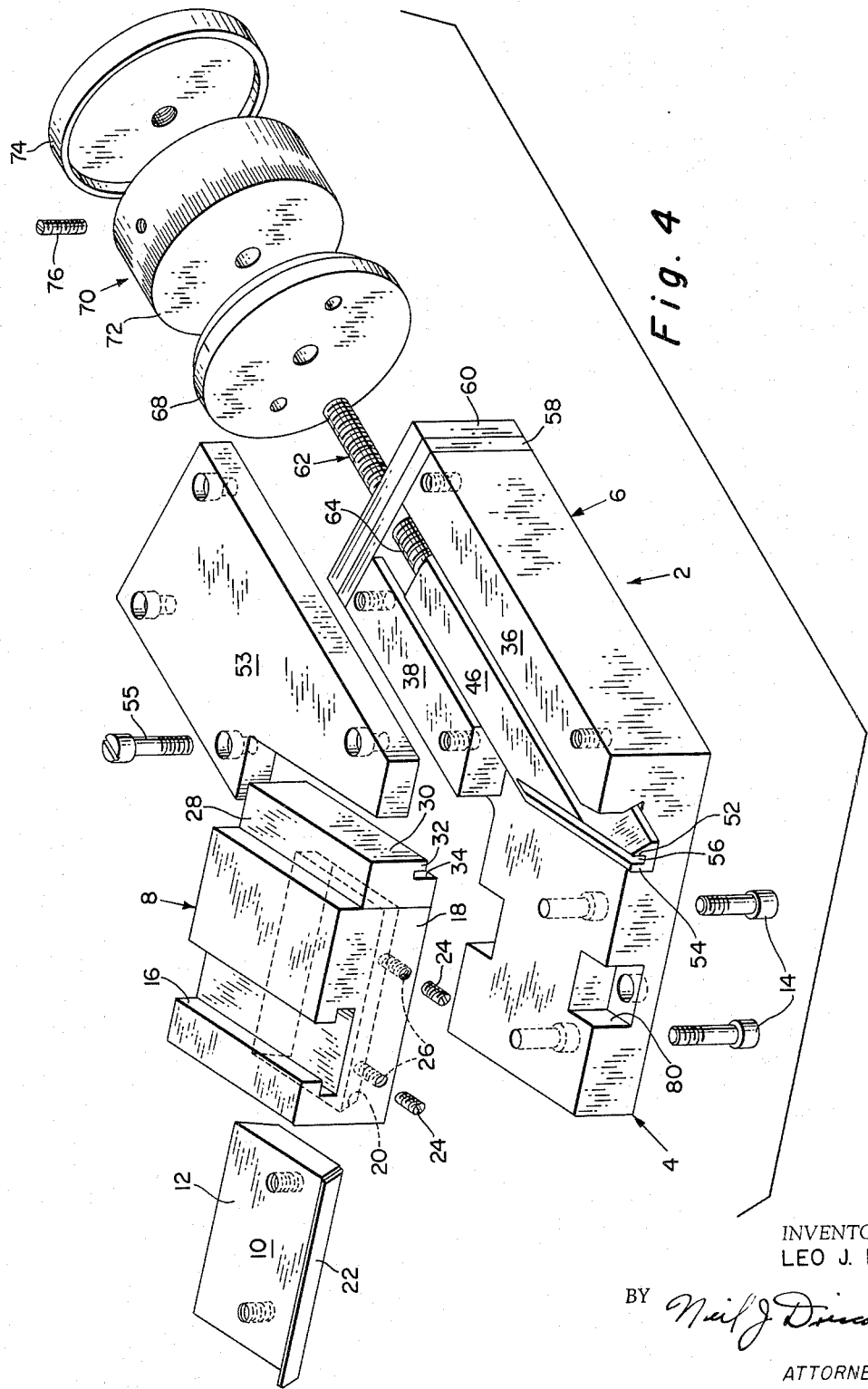

United States Patent Office 3,217,572
Patented Nov. 16, 1965

3,217,572
PRECISION TURNING AND BORING
ATTACHMENT
Leo J. Ernst, 9137 Canterbury Ave., Pacoima, Calif.
Filed Nov. 12, 1963, Ser. No. 322,646
5 Claims. (Cl. 82—24)

The invention relates to a precision turning and boring attachment and has particular utility in substantially improving the efficiency of machining operations on metal working equipment.

While the herein disclosed invention reasonably may be adapted to a variety currently used metal working machines, it has specific utility when applied as an attachment to fixed tool rotating work piece equipment. For this reason the presently preferred embodiment will be described as applied to that type of turning and boring machine known in the art as a lathe.

It will be understood that a typical lathe comprises a bed having longitudinally elongated guides or ways thereon. At one end of the bed a head stock assembly is provided. Typically, the head stock assembly affords a variety of means to accurately mount and rotate a workpiece. A saddle assembly is mounted on the ways for longitudinal movement therealong. This assembly comprises a base saddle arranged for complemental gib association with the mentioned ways and a manually operable cross feed screw arrangement mounted therein. A compound rest assembly is carried by the saddle assembly and comprises a compound rest base in dove tail operable association with the saddle and cross feed screw arrangement whereby the rest assembly may be manually moved in perpendicular relation to the longitudinal axis of the ways. The compound rest assembly also includes a rest top conventionally arranged for cutting tool mounting. A compound rest swivel is carried by the compound rest base for rotational movement thereon. The swivel in turn is in dovetail guidable relationship with the rest top, the latter carrying manually operable screw means for linear movement of the rest top in relation to the swivel. It will be thus apparent to those skilled in the machining art that the compound rest base may be manually moved perpendicular to the axis of the bed ways and in generally parallel relationship to the related axis of the cross feed screw arrangement. Further the tool carrying compound rest top may be linearly moved, independently of the rest base, and in generally parallel relationship to the axis of the carried manually operable screw means. Also the compound rest top and its carried screw means may be rotated angularly as seen in plan view, relative to the compound rest base.

It is a frequent production requirement that a multiplicity of generally identical piece parts be produced in a given production run. Alternately, a given job may require that a plurality of piece parts, while not total duplicates, have turned or bored surfaces of substantially identical dimensions. While it is true that total dimensional identity is, from a practical standpoint, extremely difficult and perhaps virtually impossible to attain, it is possible to duplicate dimensions within extremely close tolerances, i.e., for example, plus or minus one ten-thousandths of an inch.

With most conventional lathes employing the above described conventional saddle and compound rest assemblies it is extremely difficult and time consuming to duplicate dimensions on consecutive pieces within the mentioned tolerance range. In the more economical lathe equipment a repeating dimension of plus or minus one-thousandths of an inch is all that can be expected without abnormally high scrap rate or excessive machining time.

With the above in mind it is a general object of the herein disclosed invention to provide a precision boring and turning attachment for metal working equipment that will enable the operator to efficiently provide dimensional repetition on successive piece parts within extremely close tolerances.

It is a further general object to the invention to provide a precision turning and boring attachment that may be economically produced and marketed.

It is yet another object of the invention to provide a precision turning and boring attachment that may be readily adapted to fit the wide variety of lathe equipment currently commercially available by substitution for the existing compound rest assembly and convenient attachment to the saddle assembly.

The present invention comprehends a turning and boring attachment which comprises a base plate, securable for example, in any conventional manner to the existing compound rest base on a typical lathe. The base plate carries a tool holding slide thereon appropriately gibbed for linear guidable movement along an axis, that, in lathe application, is preferably arranged in perpendicular relationship to the lathe bed ways. The base plate further carries manually operable means to induce the mentioned linear motion of the tool slide, such means comprising an angle slide arrangement for linear guidable movement over the plate and along an axis angularly related to the axis of motion of the tool slide. In the preferred embodiment of the invention the angle slide and tool slide are in tongue and groove mechanical interlock. Manually rotatably screw means are provided to induce the motion of the angle slide. The preferred embodiment also comprehends the operative association of appropriately scaled dial means with the screw means to the end that desired dimensions may be easily repeated on successive piece parts.

These and other advantages and features of the disclosed invention will be more clearly understood by reviewing the following description of a presently preferred embodiment and the related drawings, wherein.

Figure 1:
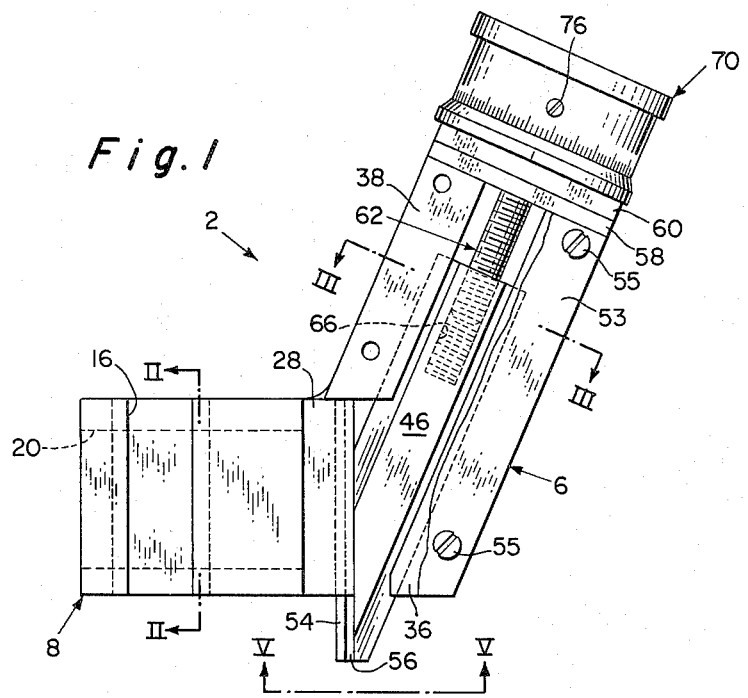
FIGURE 1 is a partially fragmentary plan view of the disclosed invention.
Figure 5:
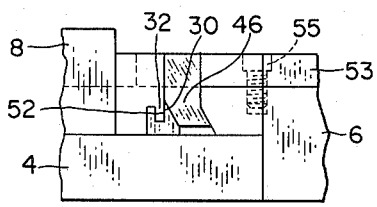
Figure 2:
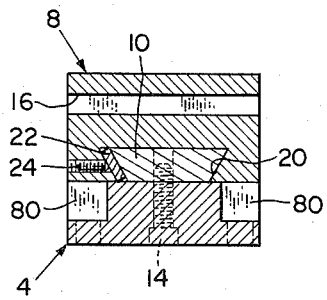
FIGURE 2 is a sectional view taken along line II—II of FIGURE 1.
Figure 3:
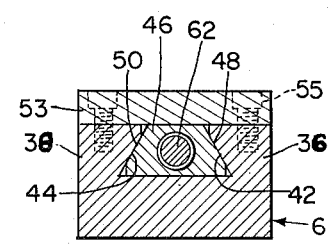
FIGURE 3 is a sectional view takent along line III—III of FIGURE 1.

FIGURE 4 is an exploded perspective view of the precision attachment and illustrating the physical relationship of the various components, and FIGURE 5 is a fragmentary elevational view taken along line V—V of FIGURE 1, Describing the invention in detail attention is initially directed to FIGURE 4 wherein the numeral 2 generally indicates the base plate of the precision turning and boring attachment. The plate 2 is provided with a forward segment 4 and a rear segment 6. It will be noted that the segments 4 and 6 are in angular relationship to each other as seen in the plan view of FIGURE 1. A tool holding slide 8 is carried by the forward segment 4, the latter having a dovetail guide element 10 secured to its upper surface 12 by cap screws 14. It will thus be understood that the guide 10 is fixedly secured to the segment 4.

In the illustrated embodiment the slide 8 is provided with a conventional T slot 16, the latter offering conventional means for tool mounting as will be familiar to those skilled in the machining arts. The slide 8 further comprises a front portion 18 having a dovetail slot 20 formed in the upper surface thereof, the slot 20 being formed to complementally receive guide 10 and companion adjustable gib 22. Set screws 24, 24 are threadably received in holes 26, 26 on the side of the slide 8. The holes 26 in turn communicate with the slot or cavity 20 so that the set screws 24 may engage gib 22 to offer snug assembly of the slide slot 20 to the dovetail 10. It will thus be apparent that the tool slide 8 is carried by the base plate 2 for linear motion over the segment 4 and parallel to the long axis of the dovetail guide 10. The adjustable gib and set screw arrangement described provides for wear taken up during use.

The tool slide 8 is provided with a rear portion 28 conventionally fixed thereto as by welding, bolting or the like. It is important to note that the rear portion 28 is provided with a rearwardly facing bearing surface 30 perpendicular to the axis of slide motion and a downwardly directed tongue and groove structure 32 and 34, respectively.

Directing attention to the rear segment 6 of the plate 2 it will be seen that generally parallel elongated walls 36 and 38 are carried on the upper part of the segment 6 and along opposed edges thereof. The segments 36 and 38 define inwardly facing guide surfaces 42 and 44, respectively. An angle slide 46 is provided with angled guide surfaces 48 and 50, the slide being physically dimensioned so the surfaces 48 and 50 complementally and slidingly engage the guide surfaces 42 and 44 when the angle slide is assembled to the segment 6. Thus the walls 36 and 38 and the mentioned guide surface engagement accommodates accurate controlled linear movement of the slide 46 in parallel relation to its longitudinal axis.

It will be noted that the angle slide 46 is provided with a bearing surface 52 (FIGURE 5) that is formed in angular relation to the long axis of the slide, as seen in plan view and in the assembled condition of the attachment, to parallel and operatively engage the bearing surface 30 of the tool slide 8. It will also appear that tongue and groove structure 54 and 56 is provided on the angle slide 46 adjacent the surface 52, said structure being formed to face upwardly for operative association with the tongue and groove structure 32 and 34 of the tool slide 8 (FIGURE 5). Cover plate 53 secured via cap screws 55 completes the assembly. While in the preferred embodiment dovetail and angle guides have been shown. It will be apparent however, that other guide configurations may be used to achieve the motion herein described.

Rearwardly of the segment 6 a pair of cover plates 58 and 60 are provided. The plates 58 and 60 offer journal mounting of screw 62, the latter having a forward threaded portion 64 threadably received within complementing elongated hole 66 in the angle slide 46. Plate 60 fixedly mounts forward plate 68 of indicating dial generally designated 70. Dial 70 further comprises central barrel 72 having a desired scale incrementally arranged thereon as will hereinafter be more fully explained. Rear dial plate 74 is fixedly secured, as for example, by conventional thread and nut means to the rear end of the screw 62. Central barrel 72 is also provided with locking screw 76 whereby the barrel may be set locked to the screw 62 in any desired rotational position thereon.

Considering a typical operation of the precision attachment it will be noted that the attachment may be mounted to a conventional saddle assembly (not shown) of a lathe and substituted for the compound rest (not shown) normally carried by such assembly as will be familiar to those skilled in the art. Screw receiving mounting slots, 80, 80 may be used for this purpose. With this preferred set up the line of motion of the tool slide 8 will be perpendicular to the axis of rotation of the work piece (not shown) carried by the lathe headstock assembly. The cutting tool (not shown) is, of course, carried by the tool slide.

Persons skilled in the machining art will be familiar with the fact that in most close toleranced turning and boring operations the cutting sequence used involves a plurality of sequential cuts. Typically, a rough, one or more semi-finish and final finish cuts are used. The depth of each cut, of course, becomes more fine as the final size dimension is approached. In the use of the disclosed attachment, it is suggested that the cross feed control of the conventional lathe saddle assembly be used for semi-finish cuts. It is the final finish cuts to close tolerance size dimensions the patent utility of the disclosed attachment is best understood.

It will be noted that manual rotation of the dial 70 induces rotation of the connecting screw 62. Motion of the latter of course, induces linear motion of the slide 46 parallel to the long axis thereof. Direct bearing engagement between the surface 52 of the angle slide and the surface 30 of the tool slide induces forward motion of the tool slide in response to angle slide motion. Because of the angular relation of the lines of motion of the tool slide and angle slide and the inclined plane effect of the respective bearing surfaces the induced linear motion of the tool slide is substantially less than the total linear motion of the angle slide. Thus a portion of the relatively large and easily repeated linear motion of the angle slide is lost and mechanically reduced to a relatively small motion of the tool slide whereby extremely fine depth of cut may be obtained. Further, the operator merely has to note at what setting on the incremented indicating dial 70 the desired, within tolerance, piece part size was achieved and, by merely returning to that setting, successive within tolerance piece part dimensions may be easily and efficiently reproduced.

To those skilled in this art it will now be apparent that the fine adjustment of the tool slide is directly related to the angle employed between the respective lines of motion of the tool and angle slides and the pitch of the threaded engagement between the screw 62 and slide 46. For example, using a ½–20 National Fine, left hand thread on the screw 62 and an angle of approximately 113 degrees and 35 minutes between the mentioned slide lines of motion approximately a 2.5 to one motion reduction will be achieved.

Clearly good machining practice will dictate that tool slide repositioning or resetting always be approached with the slide moving forwardly into the work. In this manner inaccuracies due to thread backlash are avoided and repeated precise and successive tool slide location will be achieved. The tongue and groove interlock between the slides provides for easy withdrawal of the tool slide from work position. Another feature of the disclosed attachment is that a substantial portion of the load resulting from the tool cutting action is taken up on the guide surfaces of the rear segment 6 thus avoiding excessive strain and wear on the screw 62.

It will be understood that the precision attachment shown is by way of illustration only and that various modifications may be made without departing from the scope of the appended claims.

What is claimed is:

1. In a manually operable precision turning and boring attachment for metal cutting equipment, a base adapted for mounting in fixed relation to said equipment, said base comprising a first segment and a second segment, said segments being in obtuse angular relation to each other as seen in plan view, guide surfaces carried by the first segment, a tool carrying slide mounted on the first segment and having guide surfaces thereon abuttably associated with the first mentioned guide surfaces whereby said surfaces accommodate a movement of said tool slide, second guide surfaces carried by the second segment, a second slide mounted on the second segment and having other guide surfaces thereon abuttably associated with the second guide surfaces to thereby accommodate linear movement of said second slide, manually operable screw means carried by the base for rotatable movement relative thereto and directly and operatively connected to the second slide whereby manual operation of the screw means induces movement of said second slide, means interconnecting the tool slide and second slide whereby determined incremental movement of the second slide induces substantially reduced incremental movement of the tool slide, and dial means operatively associated with the screw means and having a scale thereon incremental in relation to the movement of the tool slide.

2. A precision turning and boring attachment for metal cutting equipment according to claim 1, wherein the lines of linear motion of said tool slide and second slide are in the same angular relation as said segments as seen in plan view, said interconnecting means comprising slidably engaging surfaces on the respective slides, and tongue and groove mechanical interconnection between the slides.

3. In a directly manually operable turning and boring attachment for metal cutting equipment,
a unitary base comprising first and second segments in obtuse angular relation to each other as seen in plane view,
said base being adapted for mounting in fixed relation to said equipment,
guide surfaces on the fixed segment,
a first slide adapted to carry an operating tool and mounted on said first segment,
other guide surfaces on the slide operatively associated with first mentioned guide surfaces to accommodate controlled movement of said tool slide,
second guide surfaces on the second segment,
a driving slide mounted on the second segment and having other guide surfaces thereon in operative association with said second guide surfaces to accommodate linear movement of said second slide,
manually operable means carried by the base and in non-linear movable relation thereto,
said means directly engaging said second slide to induce linear movement of the second slide in response to manual operation of the means,
and means interconnecting the tool slide and second slide whereby incremental movement of the second slide in response to manual operation thereof induces reduced incremental movement of the tool slide,
and indicating means operatively associated with the manually operable means and having scale indicia thereon incremental in relation to the movement of the tool slide.

4. A manually operable turning and boring attachment for metal cutting equipment according to claim 3,
wherein said interconnecting means comprises abutting surfaces on the second slide and tool slide, respectively, accommodating relative surface movement therebetween,
and further includes a mechanical interlock between the tool slide and second slide,
said tool slide being guided for linear movement.

5. A manually operable turning and boring attachment for metal cutting equipment according to claim 4,
wherein said mechanical interlock comprises a tongue and groove interconnection between the slides in the area of said abutting surfaces.

References Cited by the Examiner
UNITED STATES PATENTS

| 2,658,501 | 11/1953 | Hoglund | 82—14 |
| 2,900,860 | 8/1959 | Lomazzo | 82—24 |
| 3,024,684 | 3/1962 | Stratman | 82—14 |
| 3,138,046 | 6/1964 | Vaucher | 82—24 |

FOREIGN PATENTS

| 35,412 | 4/1886 | Germany. |

OTHER REFERENCES

Webster's New International Dictionary, second edition, unabridged, June 1938, col. 1, page 146.1.

WILLIAM W. DYER, JR., *Primary Examiner.*